Patented Dec. 27, 1938

2,141,885

UNITED STATES PATENT OFFICE 2,141,885

PLASTICIZING PRODUCT OR PLASTIC

Henry P. Straus, New York, N. Y., assignor to Woburn Degreasing Company of New Jersey, Kearny, N. J., a corporation of New Jersey No Drawing. Application October 24, 1935, Serial No. 46,610

3 Claims. (Cl. 260—406)

My invention relates to a new and improved plasticizing product or plastic which possesses some of the characteristics of an oil, and some of the properties of a fatty acid gum, and a method of producing same. I obtain my new product by oxidizing the fatty acids of any suitable vegetable, animal, marine animal oils, or pitch residues from same, in the presence of a hydrocarbon solvent.

The improved product obtained by my process has a heavy molasses-like consistency. It is insoluble in petroleum spirits, but is readily soluble in all proportions in alcohol. In this alcoholic solution, it may be sprayed, or used as a paint or dip for coating or for impregnating. On evaporation of the solvent, a continuous tacky coating or film results which adheres most tenaciously to metals, wood, glass and other articles of manufacture. Such coating on solids is continuous, does not crack, peel or check, and is highly resistant to water, moisture, gasoline, or other petroleum solvents and distillates. The coating is flexible and manifests itself especially so, when used to impregnate cloth or fabrics. To these materials, it lends the very desirable characteristic of reducing ready combustibility, thus giving to such fabrics a slow burning characteristic.

Even in thin films, my product is very slow drying, and leaves a somewhat tacky surface. When commercial application requires a modification of this tackiness, the same is readily accomplished by the addition of such substances as copal gum, shellac, or other gums and resins commonly used in the trade, most of which will be found adaptable for blending with my new product. The drying may be further facilitated by the addition of the well known siccatives or driers used in the paint trade. Such blends, mixes or compounds, may be made in the usual blending kettles, or plasticizing and homogenizing machines now in public use. These combinations are effected by adding one or more of the desired ingredients with my new product, and dissolving all in a suitable solvent, or by blending solutions of the various components, whichever method is found to be most desirable or convenient.

My product possesses the valuable characteristics of being insoluble in gasoline and other petroleum derivatives, and possesses a high degree of flexibility in thin or heavy films, has a high di-electric strength and is highly resistant to the passage of moisture.

Continued exposure to air and light has little or no effect on a film of my material and I have found that a piece of cloth impregnated therewith remains flexible even after being subjected to vigorous exposure in an oxygen bomb apparatus, such as used in the rubber trade for testing aging qualities.

When a film of my product is heated to a temperature above 212° Fahrenheit the product begins to bake, after the manner of baking enamels, and this process is more rapidly effected by subjecting the product to temperatures as high as 450° Fahrenheit.

Among the uses for which my new product is particularly adapted are:

1. As a base for manufacturing gasoline resistant friction tape.
2. As a base for gasoline insoluble compounds, lacquers, and coatings.
3. For rust proofing.
4. For reducing corona effect as well as for moisture proofing insulated electric wires or cables.
5. For coating the drive surface on canvas or rubber belting.
6. For a dressing for leather belting.
7. For waterproofing leather.
8. In the manufacture of gasoline and oil resistant gaskets and washers.
9. As a plasticizer for molded articles.
10. For impregnating fabrics to make them more weather resistant and to reduce combustibility, as in awnings and the like.
11. In the manufacture of boots, shoes and working apparel for use around refineries and petroleum oil operations.
12. As a coating for the interior of flexible hose and pipe lines carrying petroleum products and for storage tanks for such products.
13. As a terminal seal for gasoline fuel connections used in airplane and automotive industries.
14. For impregnating paper containers or wrappers.
15. As a vehicle useful in the manufacture of metallic paints; also, as a prime coat for paints of a nonmetallic character.
16. As an adhesive for labeling cans, bottles and packages.
17. As an adhesive for cementing insulations in building walls or metals.
18. As a base for a gasoline resistant in manufacture of non-drying gasoline resistant putty or cement.
19. As a base for a lining for metal containers.
20. As a base for ship bottom compounds.
21. For impregnating oakum and other materials for ship caulking.

To produce my new plasticizing product or plastic I take a quantity of fatty acid as mentioned above, and dissolve same in several volumes of a neutral solvent, such as petroleum spirits or hexane. This mixture is stirred and allowed to stand, whereupon a heavy viscous product settles to the bottom. This formation continues, especially on exposure to air, and is accelerated by keeping the solution warm, just below the boiling point of the solvent.

By bubbling atmospheric air through the warm solution, the rate of formation of the product is increased, as well as the yield. The time may be cut down by bubbling pure oxygen through the solution, under like conditions. I have found also that a still more rapid method of producing my new product consists in introducing oxygen to the reaction mass under pressure while stirring the mass in a pressure vessel or autoclave. The product which settles out of the solution can be intermittently drawn off through a suitable valve at the bottom of the container. The whole batch may be treated with bubbled air or oxygen to the complete exhaustion of the original fatty acids, whereupon the supernatant gasoline solution of the unreacted portion may be decanted or piped off, leaving a minimum of the solvent solution remaining with my new product.

I wash this new product with several applications of clean warm solvent, stirring the mass thoroughly and decanting the solvent or drawing off the new product as described above, all for the purpose of removing therefrom the last traces of unreacted materials remaining in the solvent. The new product is then heated, either in the same vessel or in a supplementary closed vessel connected with a condenser, so that the slight excess of the solvent can be distilled from the new product, leaving the same free from contamination.

The new product varies in color from a dark wine-red to the straw color of pale honey, depending on the purity of the fatty acids and the temperature at which the product was developed. The process is best carried out in glass lined or stainless equipment to preserve the best color possible.

My new product made by this process or method is insoluble in petroleum distillates, benzol, toluol and other similar solvents, but is completely soluble in methyl alcohol, ethyl alcohol, glycerine, acetone, some chlorinated hydrocarbons, ethyl ether, esters of fatty acids and also in some fatty acids such as red oil (oleic acid).

As illustrative of one method of manufacturing my new product, I dissolve 100 pounds of fatty acids in 250 pounds of solvent naphtha or hexane. This solution is placed preferably in a train of containers connected in series and equipped with bottom outlets and facilities for warming the solution, although the operation can also be carried out in a single container if desired.

I warm the solution to from 130° to 140° Fahrenheit, depending on the boiling point of the solvent, and bubble a stream of oxygen through the solution, the undissolved oxygen from the first container passing to the bottom of the second container and so on, so that a minimum amount of oxygen remains after passing through the last container of the series. Instead of oxygen, I may also bubble air through the solutions in the same manner.

My new product begins to form almost immediately and the temperature of the solutions is maintained to compensate for any variations which may develop during the operation.

When the product accumulates in sufficient quantity in the bottom of the containers it is drawn off or the operation continued until the fatty acid solution is completely exhausted of oxidizable substances. The product is then either drawn off from below or the oily solvent decanted from above and the new product is washed several times, stirring vigorously, with fresh volumes of clean solvent, decanting the washed solvents or removing the product from the bottom and transferring to a clean wash tank, where the fresh solvent is again vigorously stirred into the product for the purpose of removing the final traces of unreacted materials. The remaining amount of solvent is distilled from the mass and my new product is ready for commercial application, or further compounding, depending on the use to which it is to be put.

Introduction of the oxygen or air to the solution under pressure appears to be the most rapid method for making my product. The manufacturing procedure may be varied as required by the circumstances.

It will thus be seen that the novel product is obtained by the oxidation of a fatty acid substance, in the presence of a solvent, thereby developing an oxidation product whose characteristics and some of whose commercial applications are mentioned herein.

In the preparation of my new product, I have used fatty acids from linseed, perilla, fish oils, tung oil, oiticica oil, and many others. The process is adaptable to the fatty acids of any of the so called unsaturated oils. I have found the process to be effective on the pitches which remain from the distillation of fatty acids, but the reaction product in these cases is usually very dark in color, but possesses the general characteristics of the new product made from the crude or distilled fatty acids of the original oil.

The terms "fatty acid" or "fatty acids" as used in the claims is intended to cover fatty acids of the type obtainable from linseed oil, perilla oil, fish oils, tung oil, oiticica oil and the like.

What I claim as new and desire to secure by Letters Patent is:

1. A method of producing a plasticizing product or plastic which comprises subjecting an unsaturated fatty acid obtainable from oils of the class consisting of linseed, perilla, fish, tung and oiticica oil, to an oxidizing treatment in the presence of a liquid hydrocarbon solvent in which the resulting oxidized fatty acid is insoluble, and separating the resulting precipitate from said solvent.

2. A method of producing a plasticizing product or plastic, comprising the steps of dissolving about 100 parts by weight of unsaturated fatty acids obtainable from oils of the class consisting of linseed, perilla, fish, tung and oiticica oil, in about 250 parts by weight of a neutral solvent of the type of petroleum spirits or hexane, passing an oxidizing gas through the solution, whereby a precipitate insoluble in said solvent results, and removing said solvent from said precipitate.

3. A plasticizing product or plastic, which is essentially an oxidized unsaturated fatty acid obtainable from oils of the class consisting of linseed, perilla, fish, tung and oiticica oil, said product being obtained by subjecting said fatty acid to oxidizing conditions in the presence of a hydrocarbon solvent, said product being insoluble in petroleum distillates, such as naphthas, and also insoluble in benzol and toluol, and soluble in methyl and ethyl alcohol.

HENRY P. STRAUS.